(12) United States Patent
Glazer (10) Patent No.: US 11,642,598 B2
(45) Date of Patent: May 9, 2023

(54) METHOD AND SYSTEM FOR MANAGING VIRTUAL PERSONAL SPACE

(71) Applicant: Yariv Glazer, Be'er Tuvia (IL)

(72) Inventor: Yariv Glazer, Be'er Tuvia (IL)

( * ) Notice: Subject to any disclaimer, the term of this patent is extended or adjusted under 35 U.S.C. 154(b) by 197 days.

(21) Appl. No.: 17/336,306

(22) Filed: Jun. 2, 2021

(65) Prior Publication Data
US 2022/0387895 A1 Dec. 8, 2022

(51) Int. Cl.
| | | |
|---|---|---|
| H04W 4/00 | (2018.01) | |
| A63F 13/80 | (2014.01) | |
| H04W 4/021 | (2018.01) | |
| H04W 4/12 | (2009.01) | |
| H04W 4/80 | (2018.01) | |

(52) U.S. Cl.
CPC ............ *A63F 13/80* (2014.09); *H04W 4/021* (2013.01); *H04W 4/12* (2013.01); *H04W 4/80* (2018.02)

(58) Field of Classification Search
CPC ...... A63F 13/80; A63F 13/352; A63F 13/235; H04W 4/00; H04W 4/021; H04W 4/12; H04W 4/80
USPC .......................................................... 370/329
See application file for complete search history.

(56) References Cited

U.S. PATENT DOCUMENTS

| | | | |
|---|---|---|---|
| 10,439,678 B2* | 10/2019 | Ko ........................ H04L 67/561 |
| 10,755,542 B2* | 8/2020 | Bogdan ............ G08B 13/19656 |
| 10,924,880 B1* | 2/2021 | Sokolov ................. H04W 12/06 |
| 2010/0030578 A1* | 2/2010 | Siddique ................. H04W 4/00 705/26.1 |
| 2013/0181834 A1* | 7/2013 | Bentley .............. G08B 13/2462 340/539.13 |
| 2014/0247146 A1* | 9/2014 | Proud ..................... H02J 50/80 340/870.02 |
| 2018/0356514 A1* | 12/2018 | Lakamraju ................ G01S 5/14 |
| 2020/0143085 A1* | 5/2020 | Cooner ............... G06F 21/6263 |
| 2021/0058474 A1* | 2/2021 | Mukundala ............. H04L 67/04 |
| 2021/0144543 A1* | 5/2021 | Mun ....................... H04W 8/18 |
| 2021/0373676 A1* | 12/2021 | Jorasch ............... H04L 12/1822 |
| 2021/0377701 A1* | 12/2021 | Lotter ................... H04W 4/029 |
| 2022/0248188 A1* | 8/2022 | Jones ...................... H04W 4/80 |

* cited by examiner

*Primary Examiner* — Marceau Milord (57) ABSTRACT

A method and system for managing personal virtual space, comprising: establishing at least one threshold distance needed to generate a personal virtual space breach alert; creating a first unique identifying signal; transducing the signal into a transmissible medium; transmitting the signal by a first electronic device; receiving the signal by at least one other electronic device; processing the signal with at least one processor; calculating distance to first electronic device using the processed signal; communicate the distance to at least one management processor; calculating at least one other distance from the first electronic device to the other electronic device; communicate the at least one other distance to the management processor; calculating a personal virtual space breach from the distances; creating a personal virtual space breach alert; transmitting the personal virtual space breach alert; receiving the personal virtual space breach alert at a plurality of physical notification devices; changing the state of at least one of the physical notification devices.

17 Claims, 10 Drawing Sheets

\* The radius corresponds to the duration of the status
\*\* The arrows show personal virtual space breach Legend:

Immune
Sick
Healthy

METHOD AND SYSTEM FOR MANAGING VIRTUAL PERSONAL SPACE

This application is a continuation application of U.S. Provisional Application No. 62/704,934, filed Jun. 3, 2020, and incorporates by reference the disclosure therein.

RELATED APPLICATION

Methods, apparatus, and applications for managing virtual personal spaces are generally known. For example, U.S. patent application Ser. Nos. 14/720,530 and 17/246,670 incorporated by reference herein.

FIELD AND BACKGROUND OF THE INVENTION

The current invention relates to a method and apparatus for applications of virtual personal space management processor. The invention is particularly useful with respect to maintaining social distancing, epidemiologic investigations, and kinesthetic activities, where a personal virtual space may be breached. The invention is also useful with respect to extending a virtual personal space to include more persons in order to physically protect or monitor such persons. The invention is therefore described below particularly with respect to such applications, but it will be appreciated that the invention can also be used in many other applications involving personal virtual space.

Many techniques are known for creating personal virtual space by utilizing radio waves such as Bluetooth (BT/BLE), Ultrawide band (UWB), and Near Field Communication (NFC). Such known techniques generally include an apparatus for measuring distance by transmitting Radio Frequency ID (RFID) and receiving similar RFIDs from a nearby apparatus. The distance may be calculated by several methods such as Time-of-Flight (TOF) and Received Signal Strength Indication (RSSI). Based on the measured distance, said apparatus may trigger alerting methods such as light, sound, vibration, and the like.

One drawback of the known apparatus is that because each apparatus measures distance independent from said neighboring apparatus, it is common to find that one device will indicate a personal virtual space breach while the others calculate distance that is not breaching its personal virtual space.

Object and Brief Summary of the Present Invention

An object of the present invention is to provide methods and systems for managing personal virtual space in a manner having advantages in one or more of the above respects.

According to one embodiment of the present invention, there is a system for managing personal virtual space comprising: a communication channel for transmitting and receiving data; a first user-end electronic device capable of transmitting a unique identifying signal and receiving identifying signal, the first user-end electronic device being comprised of a first processor, a first non-transitory computer-readable memory element, a first transmitting and receiving circuit capable of transmitting and receiving data via the communication channel, at least one physical notification devices having at least two states, capable of changing their state, and a power supply; a first computer readable instruction set, stored on the first non-transitory computer-readable memory element; at least one other neighboring electronic device capable of transmitting and receiving a unique identifying signal and receiving identifying signal, the neighboring electronic device being comprised of a second processor, a second non-transitory computer-readable memory element, and a second transmitting and receiving circuit capable of transmitting and receiving data via the communication channel, a second computer readable instruction set stored on the second non-transitory memory element; and a management processor; wherein at least one neighboring electronic device is capable of initiating the second processor to execute the first computer-readable instruction set, so that it transmits a unique identifying signal through the second transmitting and receiving circuit to the communication channel; wherein the first transmitting and receiving circuit receives the unique identifying signal, initiating the first processor to execute the first computer-readable instruction set, so that it calculates the distance from the user-end device and communicate the distance to the management processor; wherein the management processor receives at least one more distance calculation between the user-end device and the neighboring device; wherein the management processor confirms or deny that a distance is below or above a threshold value; and, whereupon confirmation has received the second processor communicates a change-in-state for the at least one physical notification device and the at least one physical notification devices changes it state. A physical notification device has a state that can be switched between at least two states. For example, a physical notification device might be a light that can be either on or off. The state of the device is therefore either "on" or "off." Building on this example, a physical notification device might be a colored light that can be "red", "yellow", or "green" such as a familiar traffic light. A physical notification device has to have at least two states and it has to be able to change the state in response to a change-in-state order.

A user-end electronic device will typically have a processor, a non-transitory computer-readable memory element, a chipset allowing for the transmitting and receiving of data and signals, an input device, and output device, and a power-supply. A cellphone is an example of user-end electronic device, and it usually contains a chipset allowing for transmitting and receiving using Bluetooth and a second chipset allowing for transmission and receiving of signals and data using the cellular network. A user-end electronic device can also be a control network containing a sensor, a controller (a processor specifically intended to control a system), a non-transitory, computer-readable memory element, and a transmitting and receiving chipset.

According to a broad aspect of the present invention, there is provided methods of managing personal virtual space by utilizing apparatus attached to persons, said method comprising: apparatus to transmit ID and receive neighboring IDs; a processor for calculating distances; characterized in that the method further comprises a database to store distances; and a management processor to manage breaching of personal virtual space.

According to farther aspect of the present invention, there is provided a plurality of apparatus for managing personal virtual space comprising: apparatus for producing sound; apparatus for receiving sound; apparatus for broadcast Radio Frequency ID (RFID); and apparatus for receiving RFIDs; characterize in that whereupon broadcasting an RFID signal, said apparatus for producing sound emits sound ID; when neighboring apparatus receive said broadcast RFID, said neighboring apparatus also receive said emitted sound ID; and, similar to the effect of lightning and thunder, said neighboring apparatus calculate distance to said apparatus for managing personal virtual space. With respect to said sound ID, the ID may be emitted in ultrasound waves. In other examples, said distance calculation may be use Time of Flight (ToF) algorithm.

In some systems described below, the apparatus further comprises an enclosed design to be attached to the body of the person in order to prevent loose elements and improve safety in places where machines are present. In other systems described below, the apparatus further comprises an enclosure designed to be covered with a disposable cover to protect the object against physical contamination. With respect to alerting breaches of a personal virtual space, the management processor is also programmed to consider distances from the breaching apparatus, when the distance between the breaching apparatus and the personal virtual space apparatus is less than a specified value.

According to a more specific aspect of the invention, there is provided a system for managing personal virtual space, comprising: an apparatus to transmit ID and receive IDs from a nearby apparatus; an alerting apparatus to capture the attention of said person; a processor for calculating distances from said nearby apparatus; a database to store said distances; characterized in that the apparatus further comprises a management processor to manage breaching of personal virtual space, programmed to activate said alerting apparatus when the distance between the person and a nearby person is less than a specified value. The alerting apparatus may include a combination of light making apparatus, sound making apparatus, vibration making apparatus and an electric or shock making apparatus.

Many embodiments of the present invention are described below and include examples wherein the management processor is programmed to permit a plurality of different threshold distances to be specified for activating a plurality of warnings. Other embodiments of the invention described below includes examples where the management processor determines whether to activate a breach warning based on distances from multiple apparatus. In other examples, the management processor is programmed to activate a breach alert when distance exceeds a threshold value.

It will be appreciated that still other embodiments could use both approaches, could use more than two thresholds for activating the alerting apparatus, and/or could use more than two distances for doing so.

According to more features of the preferred embodiments, there is provided a system for managing personal virtual space, comprising: an apparatus to transmit ID and receive IDs from nearby apparatus; an alerting apparatus to capture the attention of said person; a processor for calculating distances from said nearby apparatus; a database to store said distances; characterized in that the apparatus further comprises a management processor to manage breaching of personal virtual space, programmed to activate said alerting apparatus when the distance between the person and a nearby person is less than a specified value; and a reporting server for conducting epidemiologic investigations. In some preferred embodiments described above, the invention is particularly useful in a hospital setting, factories, shopping environments, or offices.

The embodiments above are particularly useful for riders of public transportation such as fairy, buses, trains, and share rides, specifically when conducting an epidemiologic investigation after an infected person was found and other persons that came in contact with said person need to be invited for testing. More environments such as amusement parks, public beaches, and sporting facilities may also benefit from the preferred embodiment above when epidemiologic investigations are conducted.

According to further features of the preferred embodiments, there is provided a system for managing personal virtual spaces, comprising: an apparatus to transmit ID and receive IDs from nearby apparatus; an alerting apparatus to capture the attention of said person; a processor for calculating distances from said nearby apparatus; a database to store said distances; characterized in that the apparatus further comprises a management processor to manage breaching of personal virtual space, programmed to activate said alerting apparatus when the distance between the person and a nearby person is less than a specified value; and a gaming processor for determining which apparatus may be consider as 'friend' and which as considered as 'foe', wherein a 'friend' apparatus will not breach the personal virtual space even if a distance is below a set value.

In other preferred embodiments of the invention, said gaming processor may be used for activities to teach about social distancing and healthy behavior. Still in more examples of the preferred embodiment described below, said gaming processor may be used to manage speed dating, where 'friends' are apparatus that have not yet been breached and 'foes' are apparatus that have been breached. In more preferred embodiments of the invention, said gaming server may be used for managing random meetings with new people in large crowd settings. Some examples of large crowd settings may include a foyer, conference halls, and dining halls.

Yet still further features in some described preferred embodiments the gaming processor being programmed for family protection space where responsible members such as parents, grandparents, and older siblings ('guardian') casts a personal virtual space over the rest of the family members and said management processor determines a breach when a member distance exceeds a specific value. In more embodiments of the invention said family may be a group of people that are not related.

According to more features in some described preferred embodiments, the gaming processor is programmed to be used for promoting random encounters in order to increase innovative thinking. The invention is particularly useful in office settings, research facilities, or hospitals, where random encounters can reduce time, improve productivity, and help with selecting the course of treatment.

Several preferred embodiments of the invention are described below for purposes of example.

BRIEF DESCRIPTION OF THE DRAWINGS

The invention is herein described, for purposes of example only, with reference to the accompanying drawings, wherein.

It is to be understood that the drawings and the descriptions below are provided primarily for purposes of facilitating understanding of the conceptual aspects of the invention and various embodiments thereof, including what is considered to be a preferred embodiment. In the interests of clarity and brevity, no attempt is made to provide more details than necessary to enable one skilled in the art, using routine skill and design, to understand and practice the described invention. It is to be further understood that the embodiments described are for purposes of example only, and that the invention is capable of being embodied in other forms and applications then described herein.

DESCRIPTION OF THE INVENTION AND PREFERRED EMBODIMENTS

Figure 9:
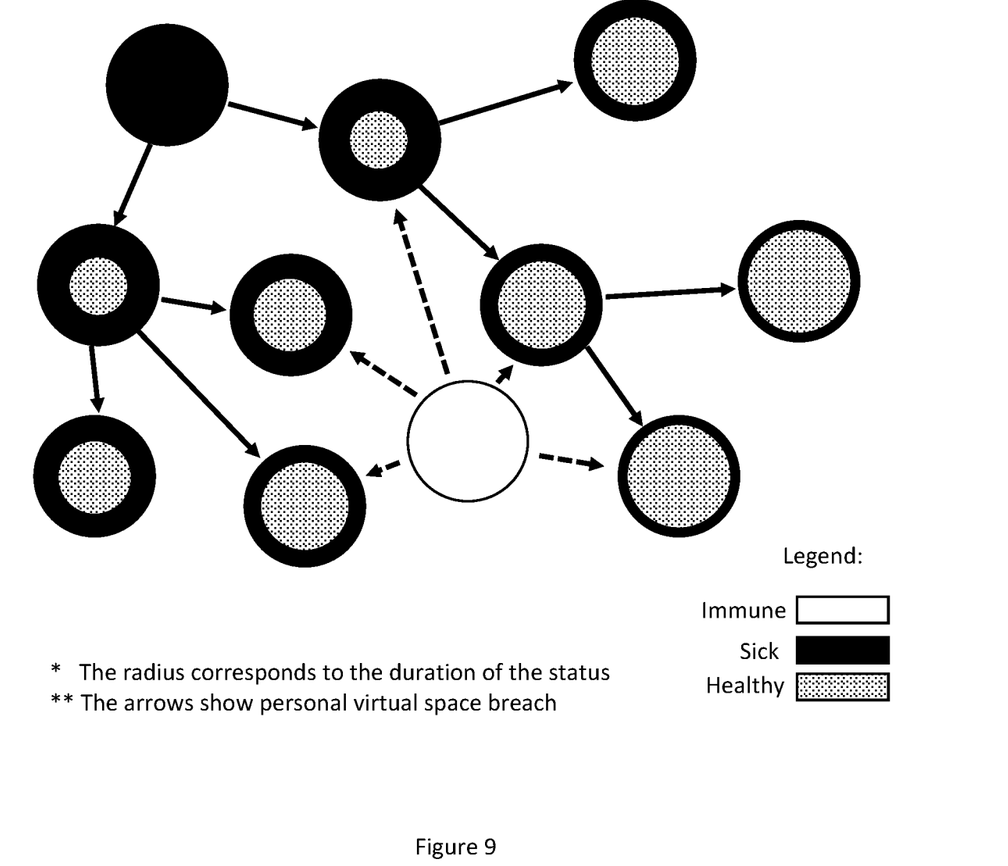
FIG. 9 below is an example for epidemiologic map.
Figure 10:
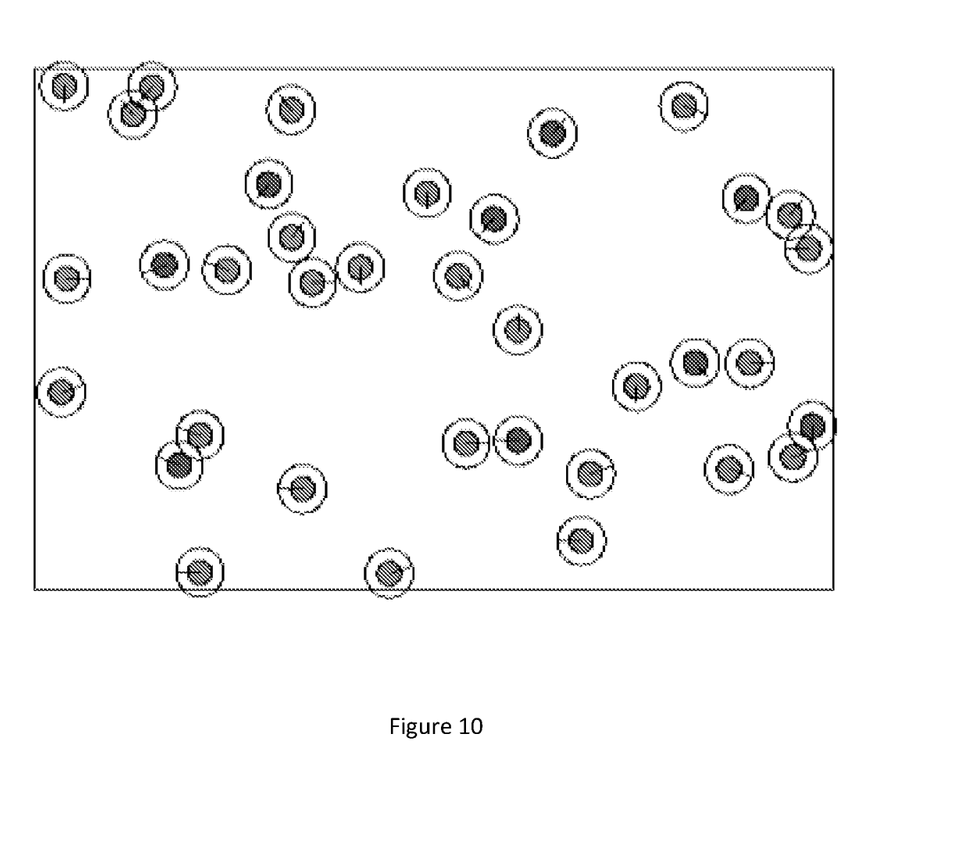
FIG. 10 below shows an example of a free moving space such as a lobby, a conference hall, a factory floor, an amusement park, or a sport facility, wherein persons are moving and interacting with many other persons.

As indicated earlier, the invention involves a method and apparatus for managing personal virtual space. FIG. 1, FIG. 3, FIG. 5, and FIG. 7 are block diagrams of an overall system constructed in accordance with the present invention, and FIG. 2, FIG. 4, FIG. 6, and FIG. 8 are schematic flow diagrams of several preferred embodiments of the invention. FIG. 9 is an example of an epidemiologic map that may be produced by the reporting server (block 56 in FIG. 5), and FIG. 10 is an example of persons using a preferred embodiment of the system in FIG. 1 at closed courters.

Figure 1:
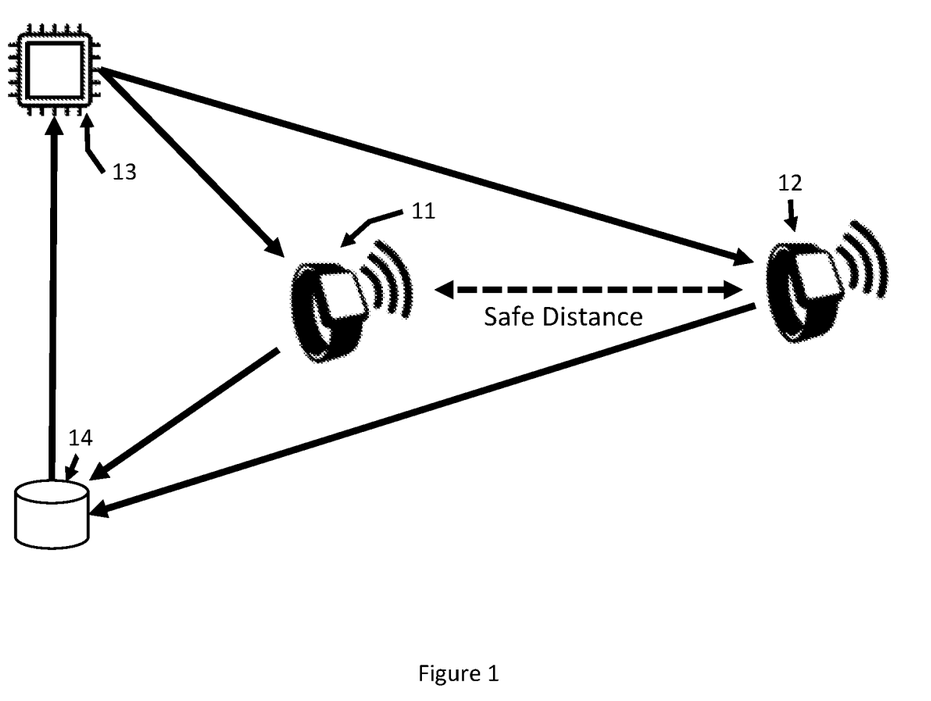
FIG. 1 is a block diagram of a personal virtual space system constructed in accordance with the invention.

Overall System of FIG. 1

FIG. 1 illustrates an overall system constructed in accordance with the present invention.

Briefly, as illustrated in FIG. 1, the system includes a user-end device 11, capable of transmitting a unique ID and receiving unique ID from other devices; at least one other device 12, capable of transmitting a unique ID and receiving IDs from other devices; a processor 13 for calculating distances from the received IDs, and a database for storing information about received IDs, generally designated 14. The processor 13 may be used for confirming to the devices that their personal virtual space was breached, and an alert should be presented to the users.

Figure 2:
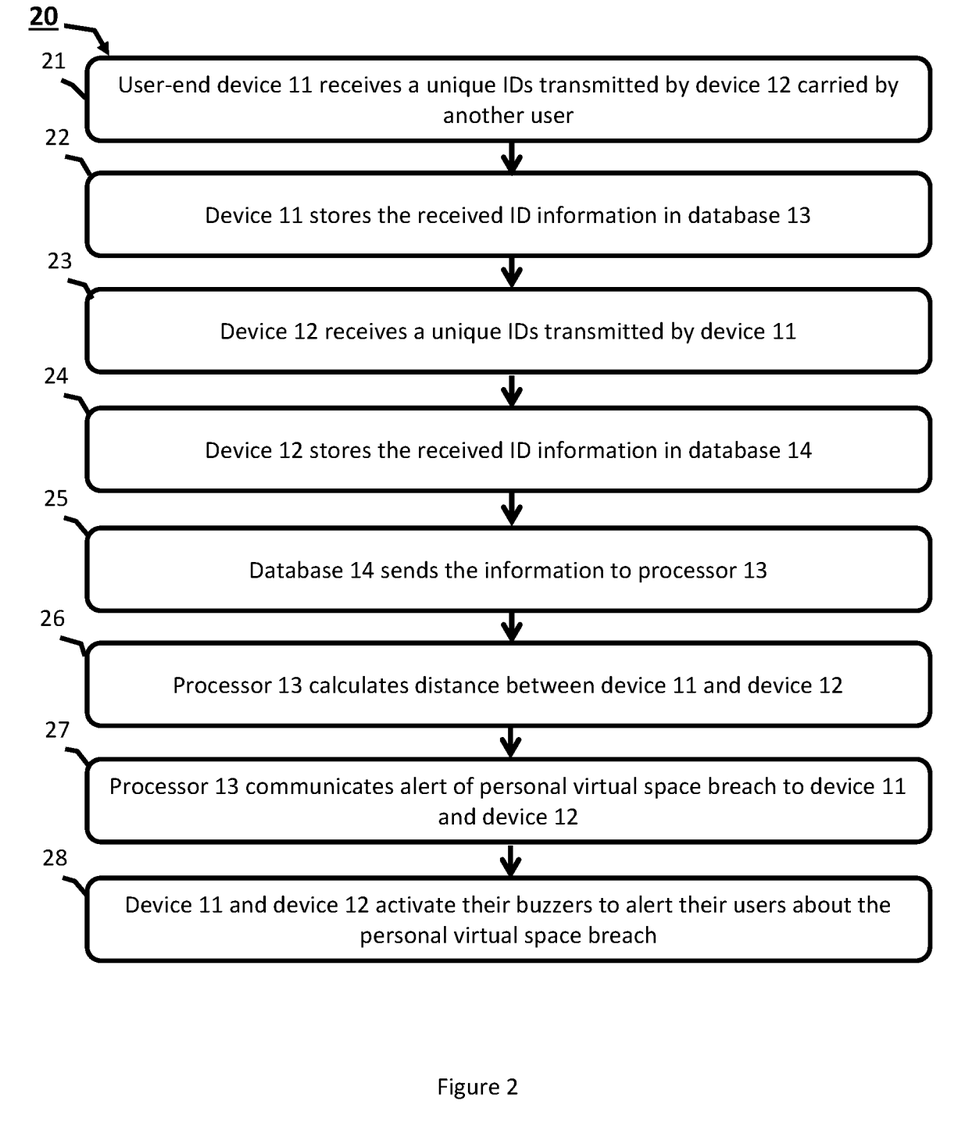
FIG. 2 is a flow diagram illustrating the overall operation of the system of FIG. 1.

The flow diagrams of FIG. 2 illustrates a preferred embodiment of the invention in FIG. 1 with respect to social distancing, such as in medical setting, where a person would like to keep safe distance from other persons in order to prevent infection. In these examples, device 11 carried by one user, receives a unique ID transmitted by device 12 carried by another user, device 11 stores the received ID information in database 14. Similarly, device 12 receives a unique ID transmitted by device 11, and also store the received ID information in database 14. Database 14 sends the information to the processor 13 for calculating the distance between device 11 and device 12. If the calculated distance is below a specific threshold, processor 13 communicates alert of personal virtual space breach to device 11 and device 12. In turn, device 11 and device 12 activate their buzzers to alert their users about the personal virtual space breach.

As noted above, these embodiments of the invention are particularly useful for persons attending workplaces, offices, hospitals, and shopping environments, in that they provide attendees with the ability to maintain safe distance from each other.

Figure 3:
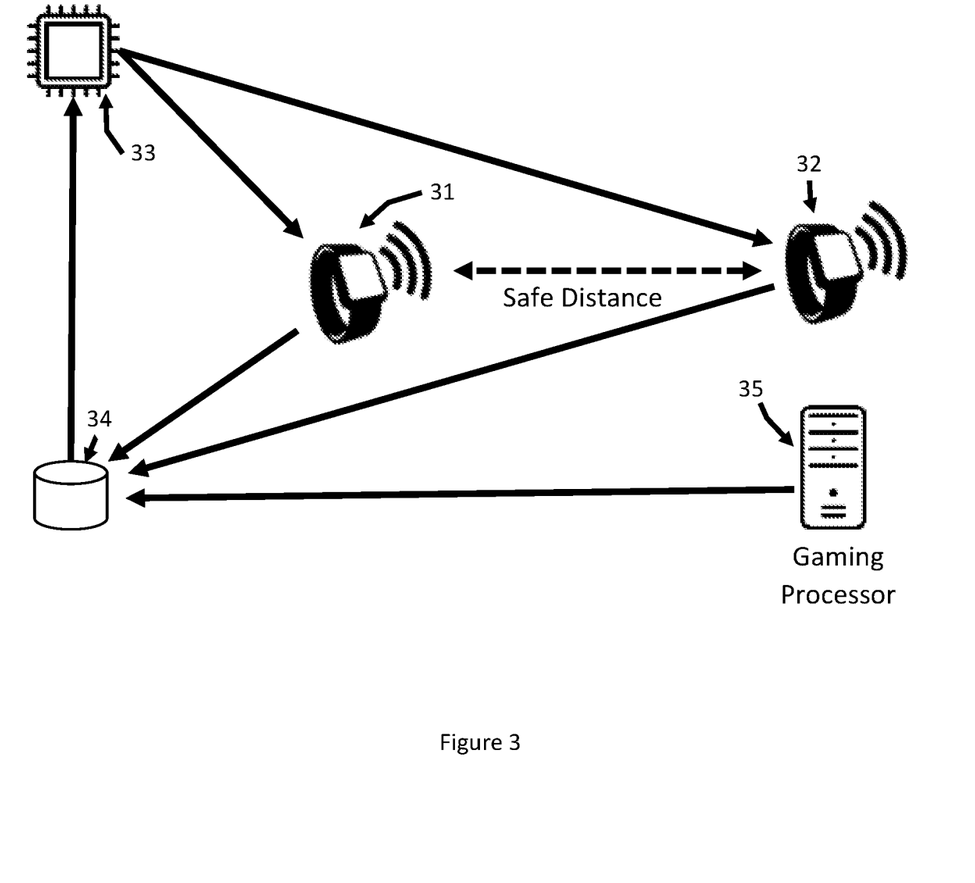
FIG. 3 is a block diagram illustrating various options that may be selected in implementing the system of FIG. 1.
Figure 4:
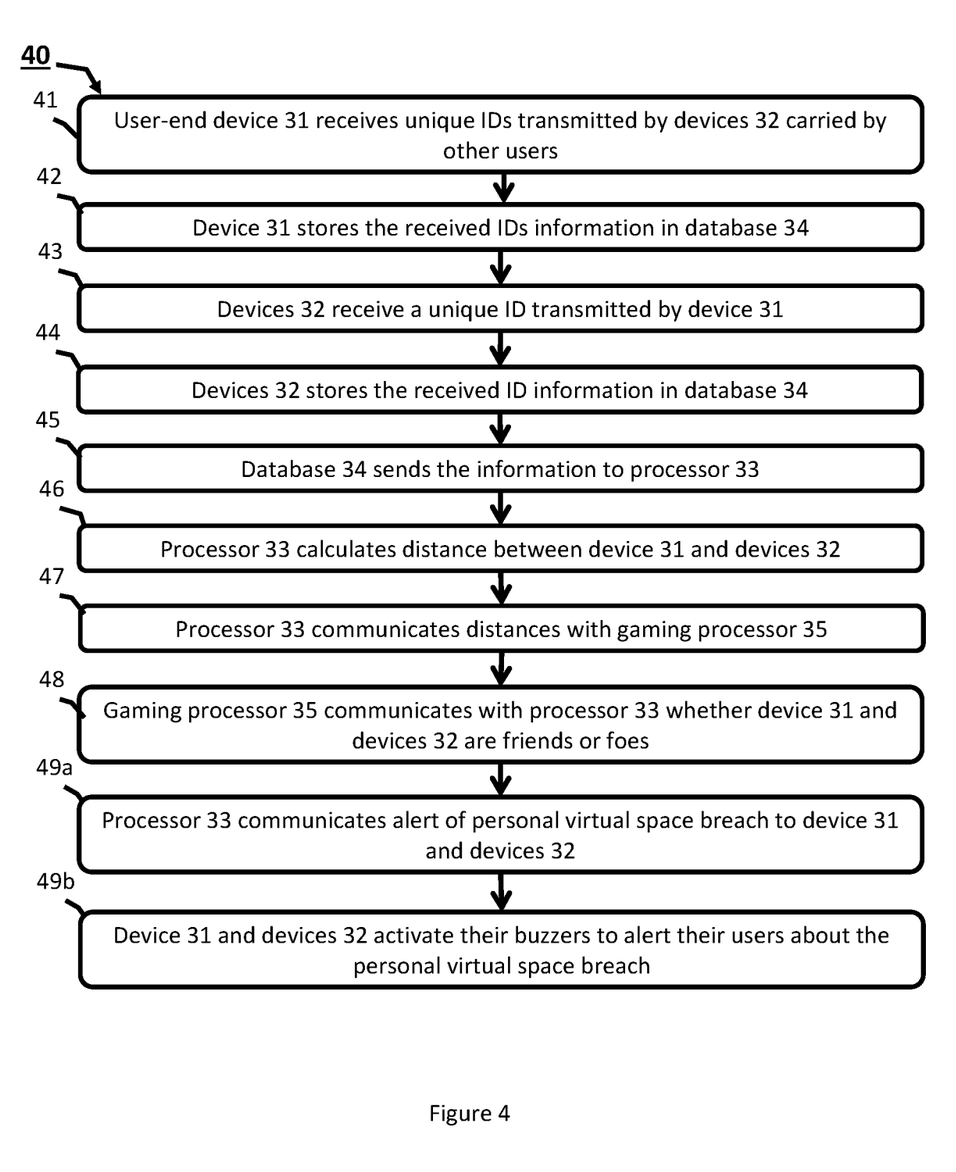
FIG. 4 is a flow diagram illustrating a preferred implementation of the system of FIG. 3 with respect to education, social activities, safety, and productivity.

The Embodiments of FIG. 3 and FIG. 4

FIG. 3 illustrates more preferred embodiments of the system of FIG. 1, wherein the system includes a user-end device 31, capable of transmitting a unique ID and receiving unique IDs from other devices; at least one other device 32, capable of transmitting a unique ID and receiving IDs from other devices; a processor 33 for calculating distances from the received IDs information, and a database for storing distances and information about received IDs, generally designated 34. The system also includes a gaming processor (35) for managing kinesthetic activities with respect to personal virtual space where devices may be assigned roles such as 'friend' or 'foe'. Such kinesthetic activities may trigger a personal virtual space breach alert only when a 'foe' device distance is below a specific threshold.

The flow diagrams of FIG. 4 illustrate some preferred embodiments of the invention in FIG. 3 with respect to interpersonal activities involving random and pseudo random meetings. In these embodiments device 31 carried by one user, receives a unique ID transmitted by devices 32 carried by other users, device 31 stores the received ID information in database 34. Similarly, devices 32 receive a unique ID transmitted by device 31, and also store the received ID information in database 34. Database 34 sends the information to the processor 33 for calculating the distance between device 31 and devices 32. If the calculated distances found to be below a specific threshold, processor 13 communicates with gaming processor 35. Gaming processor 35 communicates with processor 33 whether device 31 and devices 32 are friends or foes, and if the devices have been assigned 'foe' roles, processor 33 communicates alert of personal virtual space breach to device 31 and devices 32.

Figure 5:
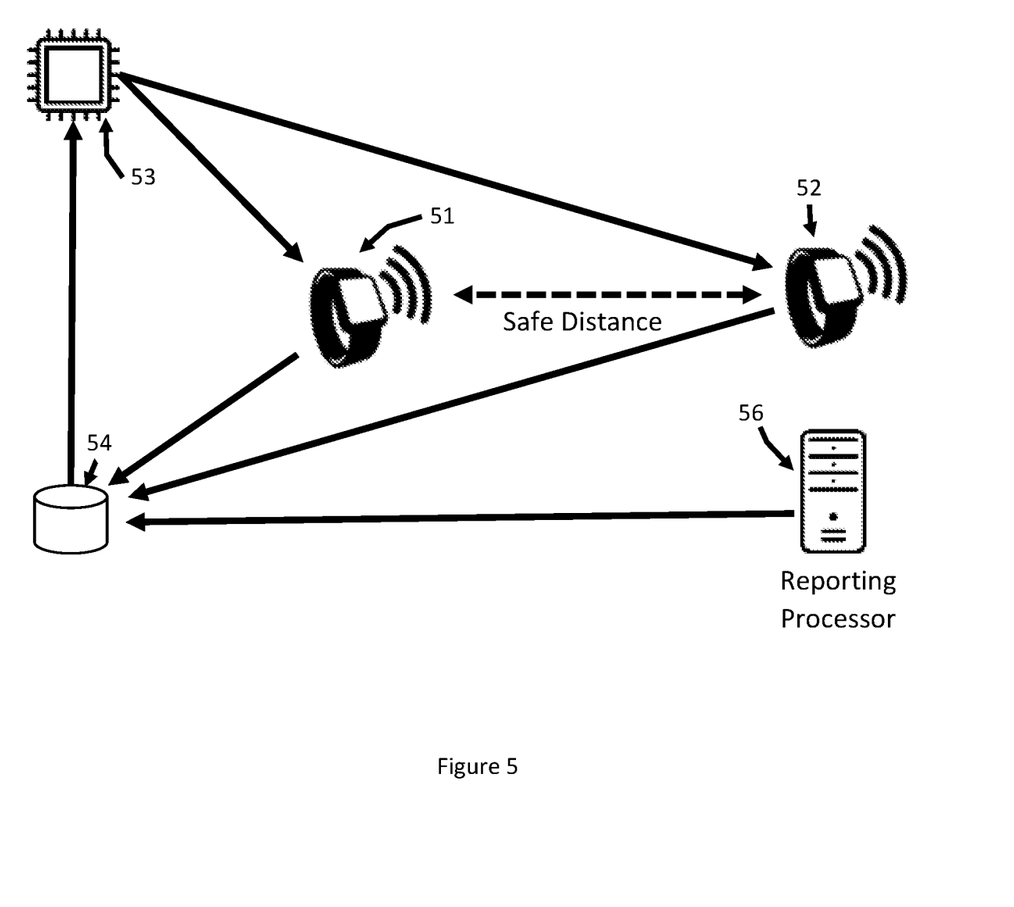
FIG. 5 is a block diagram illustrating various options that may be selected in implementing the system of FIG. 1.
Figure 6:
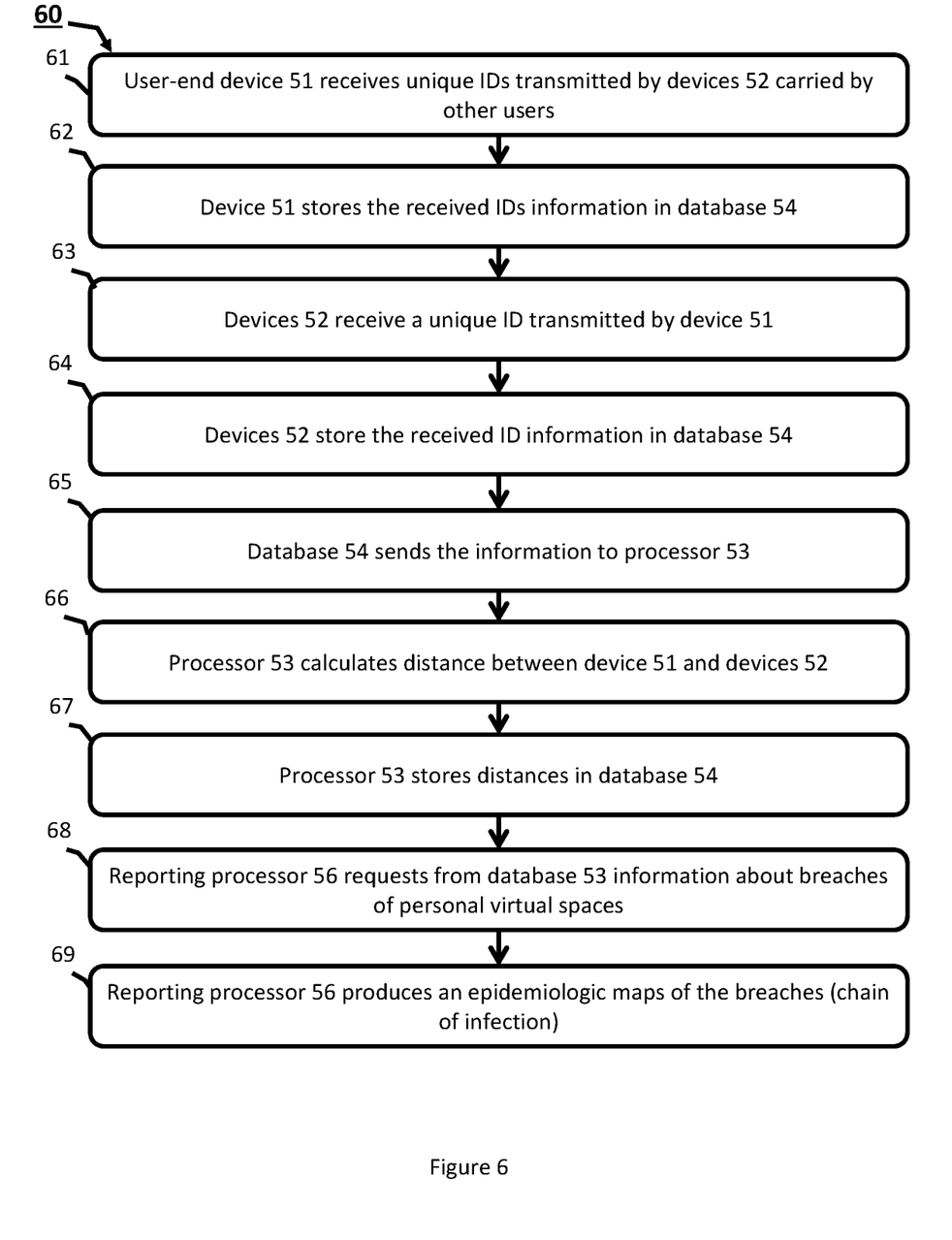
FIG. 6 is a flow diagram illustrating examples of operations of the system of FIG. 5 with respect to epidemiologic investigating and reporting.

The Embodiments of FIG. 5 and FIG. 6

The diagrams of FIG. 5 and FIG. 6 illustrate more embodiments of the invention applicable to trace back reporting, such as epidemiologic investigation.

The block diagram of FIG. 5, illustrates still more preferred embodiments of the system of FIG. 1, wherein the system includes a user-end device 51, capable of transmitting a unique ID and receiving unique IDs from other devices; at least one other device 52, capable of transmitting a unique ID and receiving IDs from other devices; a processor 53 for calculating distances from the received IDs information, and a database for storing distances and information about received IDs, generally designated 54. The system also includes a reporting processor (56) for mapping and reporting past incidents where a personal virtual space was breached. These embodiments are particularly useful when an infected person was identified, and persons need to be contacted in order to invite them to be checked. The embodiment is also useful for analyzing kinesthetic activities.

FIG. 6 is a flow diagram illustrates the embodiments of the invention in FIG. 5 wherein a user-end device 51 receives a unique IDs transmitted by devices 52 each carried by a different user, device 51 stores the received ID information in database 54. Similarly, devices 52 receive a unique ID transmitted by device 51, and also store the received ID information in database 54. Database 54 sends the information to the processor 53 for calculating the distance between device 51 and devices 52. Reporting processor 56 requests from database 54 information about breaches in personal virtual spaces, to produce an epidemiologic map of the breaches (chain of infection) FIG. 9.

Figure 7:
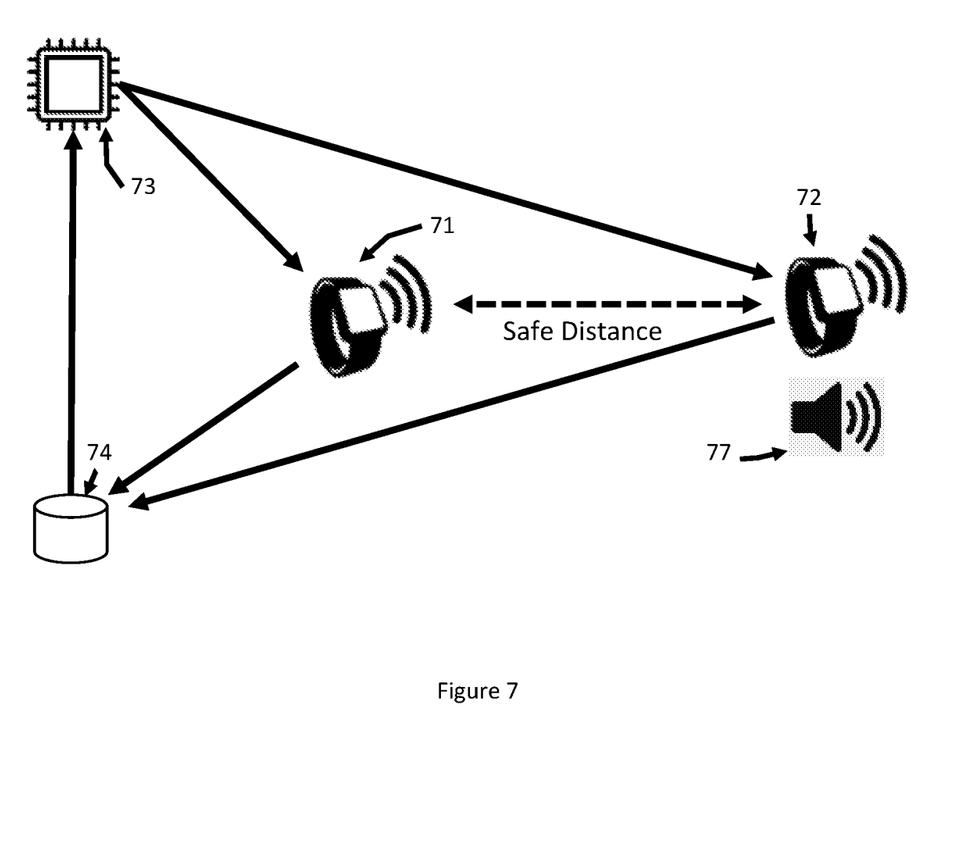
FIG. 7 is a block diagram illustrating distance calculation using the difference between the time it takes for a radio signal to travel a specific distance and the time it takes for a sound wave to travel the same distance.
Figure 8:
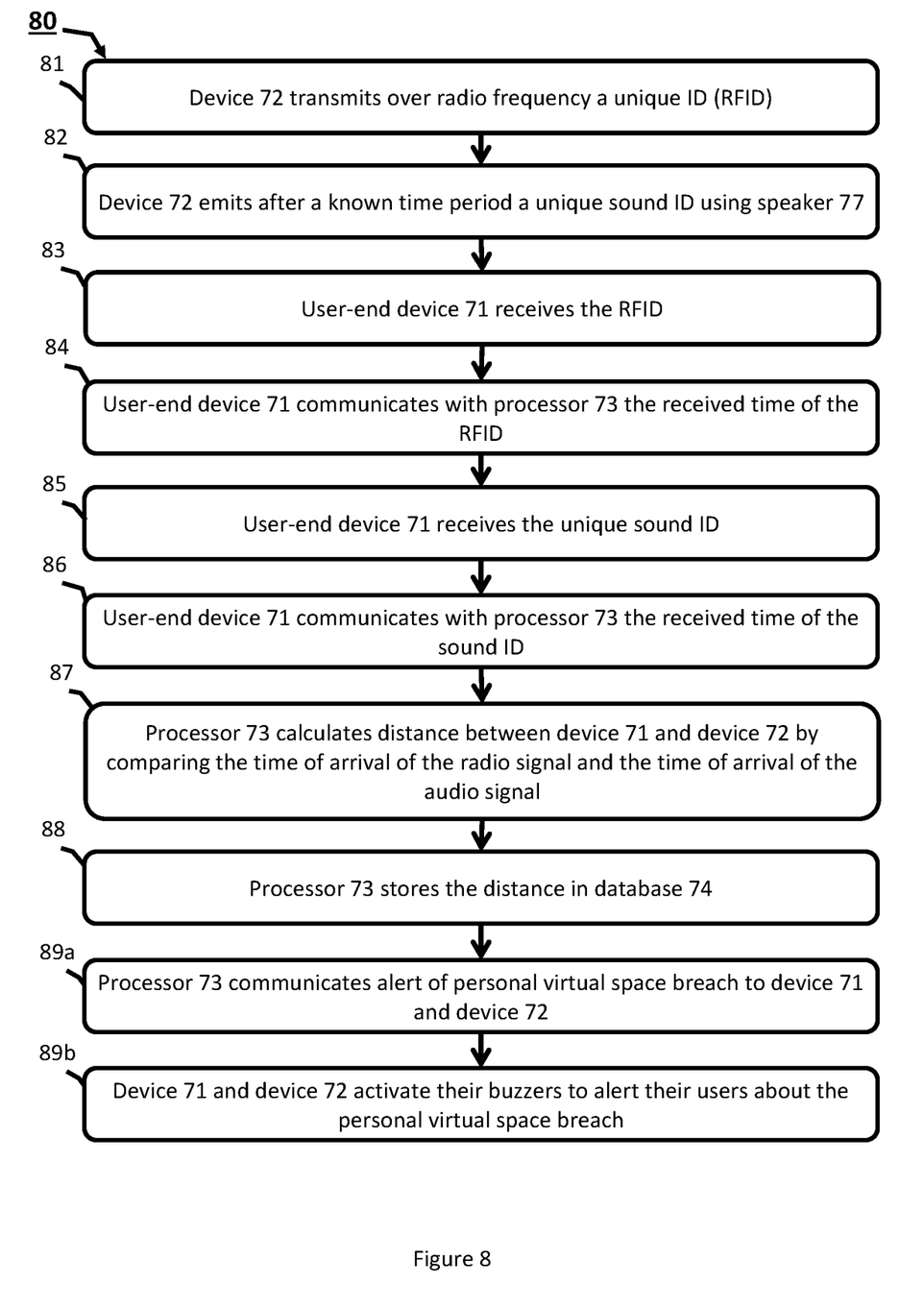
FIG. 8 is a flow diagram illustrating examples of operations of the system of FIG. 7.

The Embodiments of FIG. 7 and FIG. 8

The diagrams of FIG. 7 and FIG. 8 illustrate yet more embodiments of the invention where distance calculation is based on the difference between the speed of light and the speed of sound.

The block diagram of FIG. 7, illustrates still more preferred embodiments of the system of FIG. 1, wherein the system includes a user-end device 71, capable of transmitting and receiving unique IDs over radio frequency; at least one other device 72, capable of transmitting and receiving unique IDs over radio frequency. The system also includes a speaker and a microphone 75, attached to each device, and capable of emitting and receiving unique sound IDs; a processor 73 for calculating distances by comparing the time of receiving the radio frequency unique IDs and the receiving time of the sound IDs; and a database for storing distances and information about received IDs, generally designated 74.

FIG. 8 is a flow diagram illustrates the embodiments of the invention in FIG. 7, wherein a user-end device 72 transmits over radio frequency a unique ID (RFID) and after a known time period, emits a unique sound ID using speaker 75. User-end device 71 receives the RFID, communicates with processor 73 the time of arrival of the RFID. User-end device 71 also receives the unique sound ID and communicates with processor 73 the received time of the sound ID. Processor 73 calculates distance between device 71 and device 72 by comparing the time it takes for a radio signal to travel a distance and the time it takes for an audio signal to travel the same distance. Processor 73 stores the distance in database 74, and whereupon the distance found to be below a threshold distance, processor 73 communicates alert of personal virtual space breach to device 71 and device 72, prompting them to activate their buzzers to alert their users about the personal virtual space breach.

The Example in FIG. 9 and FIG. 10

FIG. 9 is an example for an epidemiologic map that indicates which person breached other personal virtual spaces and when.

FIG. 10 shows an example of a lobby, conference hall, or factory hall. The example below shows persons with personal virtual space interact with other persons in a closed space. Additionally, the example can be applicable to public transportation vehicles. The example is not limited to indoor spaces but can be utilized in open spaces such as amusement parks, entertainment venues, sports facilities, and city parks.

As further noted above, the embodiments of FIG. 1 and FIG. 2 are also particularly useful for users to enable a safe work environment in an office where infection may be present. These embodiments thus provide a timely and localized alert indication that employees are too close to each other and enable them to quickly remedy the situation. The embodiments of FIG. 5 and FIG. 6 enable farther investigation of such encounters in cases where employees found positive in an infection test. The embodiments are particularly useful in production floors, warehouses, assembly lines, factories, and hospital environments.

While the invention has been described with respect to a large number of preferred embodiments, it will be appreciated that these are set merely for purposes of example, and that many other embodiments, variations and applications of the invention may be made.

What is claimed:

1. A system for managing personal virtual space comprising:
   a communication channel for transmitting and receiving data;
   a management processor;
   a first user-end electronic device capable of transmitting a unique identifying signal and receiving identifying signal, the first user-end electronic device being comprised of
   a first processor,
   a first non-transitory computer-readable memory element,
   a first transmitting and receiving circuit capable of transmitting and receiving data via the communication channel,
   at least one physical notification devices having at least two states, capable of changing their state, and
   a power supply;
   a first computer readable instruction set, stored on the first non-transitory computer-readable memory element;
   at least one other neighboring electronic device capable of transmitting and receiving a unique identifying signal and receiving identifying signal, the neighboring electronic device
   being comprised of
   a second processor,
   a second non-transitory computer-readable memory element,
   a second transmitting and receiving circuit capable of transmitting and receiving data via the communication channel,
   a second computer readable instruction set stored on the second non-transitory memory element, and
   a power supply;
   wherein at least one neighboring electronic device is capable of initiating the second processor to execute the second computer-readable instruction set, so that it transmits a unique identifying signal through the second transmitting and receiving circuit to the communication channel;
   wherein the first transmitting and receiving circuit receives the unique identifying signal, initiating the first processor to execute the first computer-readable instruction set, so that it calculates the distance from the user-end device and communicate the distance to the management processor;
   wherein the management processor receives at least one more distance calculation between the user-end device and the neighboring device;
   wherein the management processor confirms or deny that a distance is below or above a threshold value; and,
   whereupon confirmation has received the second processor communicates a change-in-state for the at least one physical notification devices and the at least one physical notification devices change it state.

2. The system according to claim 1, wherein said unique identifying signal is broadcast over radio frequency; a second unique identifying signal is broadcast over sound waves after a known time; and said second distance is calculated based on the difference between the time when the radio signal was received and the time when the sound signal was received.

3. The system according to claim 1, wherein said management processor is part of said end-user electronic device.

4. The system according to claim 1, wherein said unique identifying signal transmits using Bluetooth protocol.

5. The system according to claim 1, wherein said unique identifying signal transmits using Ultra Wide Band (UWB).

6. The system according to claim 1, wherein at least one said physical notification devices include an LED.

7. The system according to claim 1 wherein at least one said physical notification devices include a vibration device.

8. The system according to claim 1, wherein said distance is calculated using Time-of-Flight (TOF) algorithm.

9. The system according to claim 1, wherein the system further comprises a gaming processor for managing kinesthetic activities.

10. The system according to claim 1, wherein the system further comprises a reporting server for producing historical reports and epidemiologic investigations.

11. The system according to claim 1, wherein said at least one more distance between the user-end device and a neighboring device is calculated by the neighboring device.

12. A method for managing personal virtual space, comprising:
    establishing at least one threshold distance needed to generate a personal virtual space breach alert;
    creating a first unique identifying signal;
    transducing said signal into a transmissible medium;
    transmitting said signal by a first electronic device;
    receiving said signal by at least one other electronic device;
    processing said signal with at least one processor;
    calculating distance to first electronic device using said processed signal;
    communicate said distance to at least one management processor;
    wherein calculating at least one other distance from said first electronic device to said other electronic device, communicate said at least one other distance to said management processor, and calculating a personal virtual space breach from said distances;
    whereupon a personal virtual space breach is found, creating a personal virtual space breach alert.

13. The method for managing personal virtual space according to claim 12, wherein the method further comprises at least one physical notification devices having at least two states, capable of changing their state;
    whereupon a personal virtual space breach alert is created, said management processor communicates said personal virtual space breach alert to said physical notification devices, and said physical notification devices change the state of at least one of said physical notification devices.

14. The method for managing personal virtual space according to claim 12, wherein the method further comprises a gaming processor for managing kinesthetic activities.

15. The method for managing personal virtual space according to claim 12, wherein the method further comprises a reporting server for producing historical reports or epidemiologic investigations.

16. The method for managing personal virtual space according to claim 12, wherein said at least one other distance is calculated by said other electronic device.

17. The method for managing personal virtual space according to claim 12, wherein said unique identifying signal is transmits over radio frequency; at least one other unique identifying signal is broadcast over sound waves after a known time period; and said second distance is calculated based on the difference between the time when the radio signal was received and the time when the audio signal was received.

* * * * *